(12) United States Patent
Neter et al.

(10) Patent No.: US 8,405,017 B2
(45) Date of Patent: Mar. 26, 2013

(54) ADJUSTABLE CMOS SENSOR ARRAY

(75) Inventors: Sarit Neter, Irvine, CA (US); Eugene Atlas, Irvine, CA (US)

(73) Assignee: Imagerlabs Inc., Irvine, CA (US)

( * ) Notice: Subject to any disclaimer, the term of this patent is extended or adjusted under 35 U.S.C. 154(b) by 348 days.

(21) Appl. No.: 12/969,387

(22) Filed: Dec. 15, 2010

(65) Prior Publication Data
US 2011/0155892 A1    Jun. 30, 2011

Related U.S. Application Data

(60) Provisional application No. 61/290,118, filed on Dec. 24, 2009.

(51) Int. Cl.
*H01L 27/146* (2006.01)
(52) U.S. Cl. ................. 250/208.1; 348/302
(58) Field of Classification Search .......... 250/208.1; 348/302, 308
See application file for complete search history.

(56) References Cited

U.S. PATENT DOCUMENTS

| | | | |
|---|---|---|---|
| 5,499,305 A | | 3/1996 | Lidke et al. |
| 7,151,246 B2 * | | 12/2006 | Fein et al. ................ 250/208.1 |
| 2003/0206480 A1 | | 11/2003 | Takahashi |
| 2005/0099378 A1 | | 5/2005 | Kim |
| 2006/0007334 A1 | | 1/2006 | Mabuchi |
| 2006/0044627 A1 | | 3/2006 | Sato et al. |
| 2007/0139541 A1 | | 6/2007 | Fein et al. |
| 2009/0001255 A1 | | 1/2009 | Hong |
| 2009/0103365 A1 | | 4/2009 | Roohparvar et al. |
| 2009/0160986 A1 | | 6/2009 | Moini et al. |
| 2009/0166569 A1 * | | 7/2009 | Canini et al. ................ 250/555 |

* cited by examiner

*Primary Examiner* — Seung C Sohn
(74) *Attorney, Agent, or Firm* — Haynes and Boone, LLP

(57) ABSTRACT

In one aspect, the present invention provides an active pixel sensor array with optimized matching between pixels and strength and frequency of incoming signals such as photons absorbed. The array comprises multiple pixels of individual geometry corresponds to spatial location. Each pixel full-well is adjustable via modifiable pixel conversion gain while maintaining pixel linearity. Furthermore each pixel internally stores multiple of extremely high frequency samples. Variable pixel geometry per row is very advantageous for Echelle spectrograph, where pixel heights are aligned with the spectrograph "order separator" where the resolution changes. In combination with variable geometry, externally adjustable full-well provides for superior spectral line separation in spectroscopy applications. In one embodiment multiple time windows with intermittent resets are stored within each pixel. This feature allows for the detection of extreme high frequency consecutive events without saturation such as may be the case with LIBS (Laser Induced Breakdown Spectroscopy).

26 Claims, 9 Drawing Sheets

ADJUSTABLE CMOS SENSOR ARRAY

CROSS REFERENCE TO RELATED APPLICATION

This application relates to and claims priority to U.S. Provisional Patent Application Ser. No. 61/290,118, filed Dec. 24, 2009, which is incorporated by reference in its entirety.

BACKGROUND

1. Field of the Invention

The present invention relates to semiconductor devices and, in particular, to complementary metal oxide semiconductor (CMOS) image and mass spectroscopy sensors.

2. Related Art

In the past decade, CMOS sensor arrays and in particular Active Pixel Sensor (APS) arrays for imaging including visible and non-visible applications have been consistently enhanced. Their significantly improved quality with respect to Charge Coupled Devices (CCDs) allows the sensors to be used in varied and challenging applications. A typical CMOS Active Pixel sensor array comprises a focal plane array of evenly spaced and equally sized pixel cells (pixels), where each pixel comprises a light (visible or non visible) detection component such as photodiode. Each pixel also has a readout circuit connected to its light detection node. The pixel includes at least a reset transistor, an amplifier transistor and a select transistor that connects to the column bus and may also include sample and hold circuitry for Correlated Double Sampling (CDS).

However in some extreme applications such as Laser Induced Breakdown Spectroscopy (LIBS) that require ultrafast electronic shutter speeds (referred to as gating), large dynamic range and low noise CMOS sensors have not been used.

Instead, the most widely used sensor in these applications is the Intensified Charge Coupled Device (ICCD) which provides high speed gating, high gain and 2-D imaging to support the Echelle spectrograph. A typical ICCD comprises an input photocathode followed by a micro-channel plate (MCP) electron multiplier, a phosphorescent output screen and a CCD. The gain of the micro-channel plate is adjustable over a wide range, with a typical maximum of about 80,000 photons pulse from the phosphor screen per one photon input. The multiplied photons are then sensed by the CCD. By amplifying each photoelectron by a gain as high as 100,000, the device essentially eliminates the readout noise of the CCD.

ICCD, however, suffers from several drawbacks. For example, Image Intensifier devices suffer from increase in Fixed Pattern Noise (FPN) due to the non-uniformity of the photoelectron gain of the device across the entire imaging area. The gain non-uniformity is further degraded due to the delay of the gating signal arrival between the edge and the center of the Intensifier (caused by the photocathode finite conductivity and referred to as "Irising"). That causes reduction in Signal to Noise Ratio (SNR) and Dynamic Range and increases device complexity for FPN correction functionality.

Further signal degradation is caused by the gain uncertainty for each interaction (referred to as electron multiplication noise) that manifests similarly to Shot Noise. This effect is characterized by the "noise factor" parameter (NF). A typical best case NF value is ~1.7. The NF has the equivalent effect of lowering the native Quantum Efficiency (QE) of the device by the square of NF. Thus, the effective QE of an Image Intensifier device with a native QE of 45% and best NF of 1.7 will be reduced down to 15.571%.

An additional problem is the limited spectral response of the Image Intensifier device, which has poor sensitivity at the longer red wavelengths, UV, and deep blue, a characteristic that is often harmful to the performance of a wide spectra range imaging systems such as Laser Induce Breakdown Spectroscopy (LIBS) or other spectroscopic systems and thus not desired.

Furthermore, an Image Intensifier device suffers from relatively low intra-frame dynamic range due to the high intensifier gain which will cause the CCD to saturate earlier. For example with Intensifier gain of 100, the effective dynamic range will be reduced by 100:1; thus a CCD with full well of 100,000 photons will effectively saturate at 1000 signal photons. Typical gains used are higher and can go up to 100,000 and hence squash down the dynamic range further.

This problem is particularly damaging to the Echelle spectrograph that simultaneously provides the strongest lines of the major elements and the weak lines of the trace elements.

The intra-frame dynamic range problem is further convolved by localized dynamic range problems. The localized dynamic range is significantly decreased due to the "halo" phenomenon of the Intensifier. The halo is the bright disk formed around high intensity points (or lines) due to electro-optical effect that occurs in the photocathode-to-MCP region in the intensifier tube. Some of the photoelectrons are not captured by the MCP; rather they are reflected azimuthally in various directions back toward the photocathode and reflected back to the MCP on which they land in a circular zone around their starting point. The halo unfortunately masks any neighboring lower signals thus reducing the local dynamic range. As mentioned above, this becomes a severe issue for the Echelle spectrograph that simultaneously provides the strongest lines of the major elements and the weak lines of the trace elements.

In addition, there is further Modulation Transfer Function (MTF) degradation (can be observed as reduced sharpness, reduced contrast and reduced spatial resolution) due to the crosstalk between channels of the Micro-channel Plate (MCP). The MTF is also degraded due to the Halo phenomenon, mentioned previously, that increases the Point Spread Function (PSF).

Accordingly, it is desirable to have a CMOS sensor array that can provide fast gating, large dynamic range and QE without the disadvantages discussed above associated with Intensified CCDs.

SUMMARY

In one aspect, the present invention provides an active pixel sensor array with optimized matching between pixels and strength and frequency of incoming signals such as photons absorbed. Each pixel in the array possesses individual geometry based on spatial location as well as externally adjustable well size and multiple integration periods.

In one embodiment multiple time windows with intermittent resets (i.e. multiple integration periods) but without intermittent reads is provided. This feature allows for the detection of extreme high frequency consecutive events without saturation.

In one exemplary implementation, the pixel individual geometry is of a rectangular shape with $X_{ij} \neq Y_{ij}$ where X is the pixel width, Y is the pixel height, i=0, 1, 2, ... m, m is the number of rows, j=0, 1, 2, ... n and n is the number of columns. Furthermore, $Y_{i1j} \neq Y_{i2j}$ where Y is the pixel height, i1, i2,=0, 1, 2, ... m, m is number of rows j=0, 1, 2, ... n, n is the number of columns and i1≠i2.

This exemplary implementation is especially adapted to sensing two dimensional spectra produced by the Echelle spectrograph, a configuration where $Y_i > X_i$ (e.g. $Y_i = 4 \cdot X_i$) where $Y_i$ dimension is aligned with the spectrograph "order separator" (also referred to as "cross disperser") where the resolution changes. The configuration can furthermore have the characteristic of $Y_{i1} \geqq Y_{i2}$ where $i1 > i2$ and $\lambda_{i1} \leqq \lambda_{i2}$ where $\lambda$ is the starting wavelength of the order range thus providing for an infrared (IR) order that is spaced closer than ultraviolet (UV) order.

In one aspect of the invention to further adjust each pixel to the incoming signal strength, the full-well of each pixel is independent and externally adjustable via the pixel conversion gain while maintaining excellent pixel linearity. Let CG denote the pixel conversion gain, then $CG_{i1,j1} \neq CG_{i2,j2}$, i1, i2=0, 1, 2, ... m, m is number of rows, i1≠i2 and j1, j2=0, 1, 2, ... n, n is number of columns and j1≠j2. Various sub cases are possible for example but not limited to $CG_{odd} > CG_{even}$ where even columns and odd columns have different conversion gain values can be used so that the pixel with the best match of conversion gain to signal level will be chosen by the signal processing chain thus allowing for simultaneous detection of very high intensity and very low intensity vertical lines which are typical to spectrogram images including the Echelle spectrograph. In some cases the conversion gain values correspond to the pixel geometry. In some cases such as m·n conversion gains, each of the conversion gain values can be programmed in real-time based on prior acquired frames. In other cases such as odd/even columns (or odd/even rows) conversion gain values, no prior frame knowledge is used; rather both high and low conversion gain pixel readout values are used in combination or singled out.

Another aspect of the invention is to also adjust pixels to the incoming signal frequency, in other words to allow the detection of multiple events without saturation, or several high frequency consecutive events. The pixels are being exposed multiple times without being read in between exposure periods and with or without a reset. The downstream signal chain can then read all the stored values within each pixel simultaneously and evaluate them independently or in any desired combination.

Eliminating the read operation after sampling allows for a very high frequency sampling. The read frequency is limited by the frame rate while the sampling rate is orders of magnitude faster than the frame rate. For example a conventional array that is capable of 1000 frames/second (f/sec) has a read frequency that is ≦1 kHz. The pixel memory units sampling frequency is >10 MHz, thus allowing for a sampling of very fast occurring events.

The exposure periods and the frequency are programmable (and controlled by the external system).

If a reset is employed in between consecutive fast sampling operations, the resulted multiple exposure periods are independent of each other.

For example in Laser Induced Breakdown Spectroscopy (LIBS) or in SPARK spectroscopy after the emission of continuum radiation period and during the characteristic radiation period, some elements may show emission prior to others with a small time gap in between and with the possibility of strong signals that would saturate if a single exposure period would have been used.

The present invention solves this problem via the proprietary high frequency multiple exposure periods.

If no reset is performed in between consecutive fast sampling operations, an even faster rate can be achieved allowing detecting minute changes in the waveform of the input signal.

For example in Laser Induced Breakdown Spectroscopy (LIBS) or in SPARK spectroscopy after the emission of continuum radiation period and during the characteristic radiation period, different elements may produce emission lines of a very high frequency that cannot be detected via multiple reads as done in conventional arrays.

The present invention solves this problem via the proprietary multiple high frequency sampling operation within a single short exposure period.

These and other features and advantages of the present invention will be more readily apparent from the detailed description of the preferred embodiments set forth below taken in conjunction with the accompanying drawings.

BRIEF DESCRIPTION OF THE DRAWINGS

Like element numbers in different figures represent the same or similar elements.

DETAILED DESCRIPTION

Figure 1:
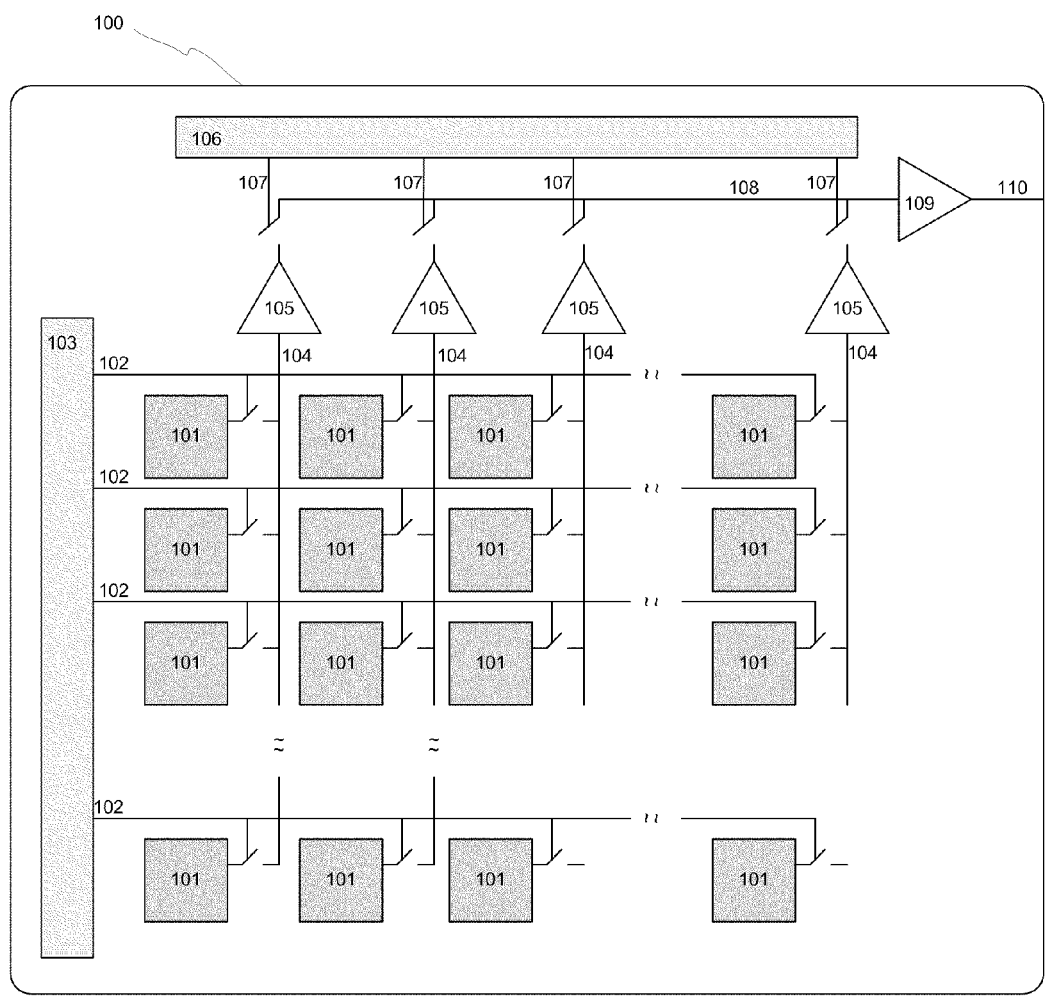
FIG. 1 is a diagram depicting conventional CMOS imaging sensor array.

FIG. 1 is a diagram of a conventional CMOS Pixel sensor 100, which comprises a plurality of square pixels 101 of identical dimensions arranged in a focal plane array. The incoming photons are detected via a photo sensing element in each pixel 101 such as a photodiode or a photogate. The diagram is applicable to both Active Pixel Sensor (APS) and a Passive Pixel Sensor. For an APS, there is at least one additional reset control line going to all pixels (not shown here). The charge is either converted to voltage inside pixels 101 for an APS design or in column bus amplifiers 105. A vertical shift register 103 controls the raw selection via buses (switches) 102, and the voltage (for APS) or charge (for passive pixel) is transferred to the column buffers 105 via a signal line 104. Horizontal shift register 106 controls selection of the output of the column buffers 105 via buses (and switches) 107 and 108. The outputs of the column buffers 105 are then individually selected by the shift register 106 to an output amplifier 109 to produce an output 110 which will be further converted to digital data either on chip or off chip (not shown here).

The sensor 100 is not the best match for situations where the spatial frequency is dramatically different for the horizontal axis versus the vertical axis such as the case for Echelle spectrograph that is widely used in various spectroscopy applications.

Figure 2:
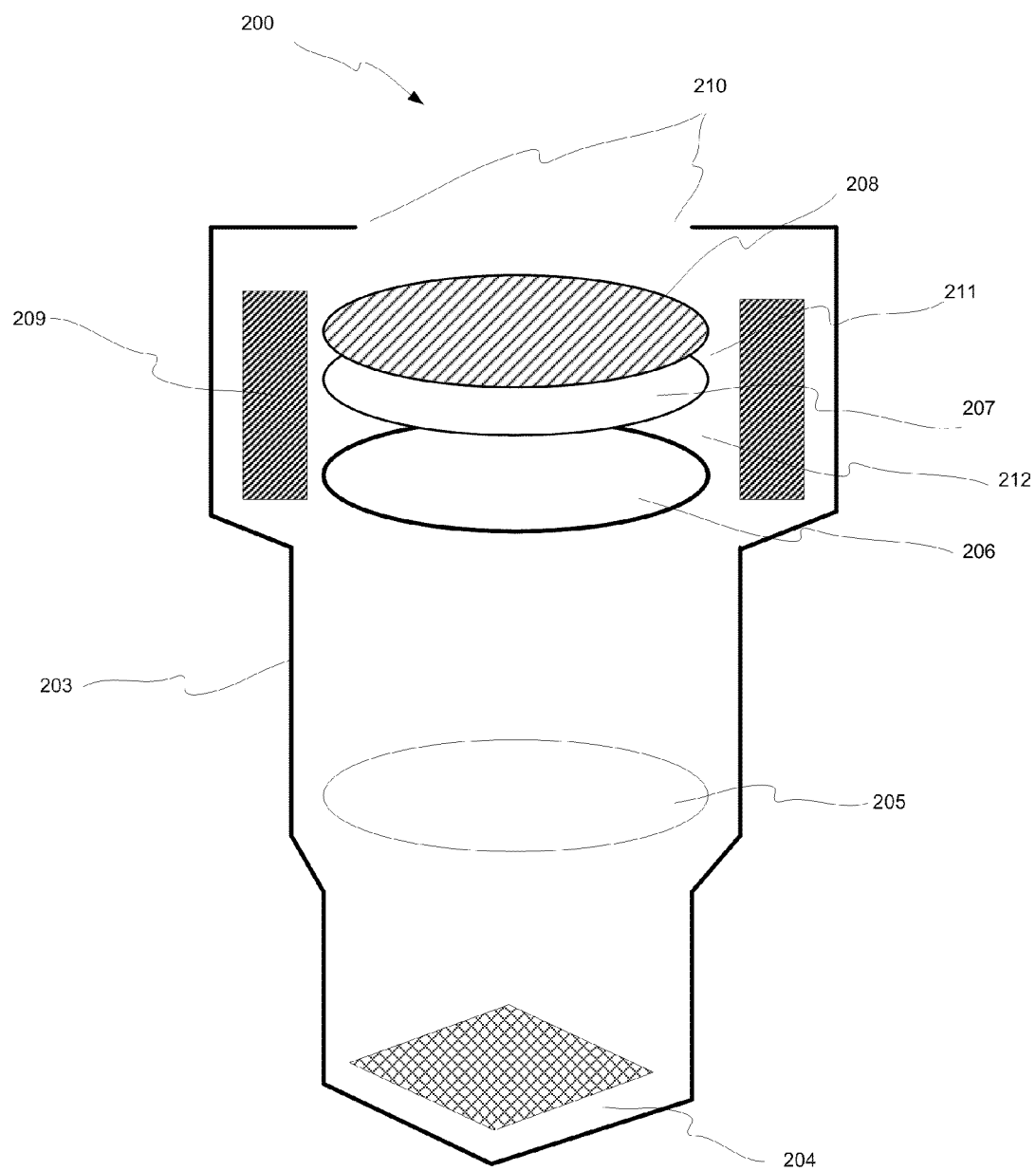
FIG. 2 is a diagram of a conventional Image Intensifier device, with an Image Intensifier tube containing a CCD.

FIG. 2 is a diagram of a conventional Image Intensifier device 200, with an Image Intensifier tube 203 containing a CCD 204. The CCD 204 integrates incoming multiplied photons through a relay lens 205 which allows for convenient interchange of the CCD sensors. The original incoming photons from the target enter the tube 203 via an opening window 210. The incoming photons are then multiplied via a multiplication block that comprises a flat photocathode 208 separated by a small gap 211 from the input side of a micro-channel plate (MCP) electron multiplier 207. The reverse side of the micro-channel plate 207 is separated from a phosphorescent output screen 206 by a small gap 212. The electrons that are released from the photocathode 208 by the incoming photons are then accelerated through the micro-channel plate 207 due to high voltages across the small gaps 211 and 212. A high voltage power supply 209 creates the high voltage across the small gaps 211 and 212. The accelerated electrons release photons from the phosphorescent screen 206 upon impact, and these photons are then sensed by the CCD 204.

There is a noise factor NF (typically equal to around 1.7) which is associated with the Image Intensifier device 200 and is the result of the uncertainty in the amount of energy that an electron that is produced by the photocathode 208 acquires when accelerated via the micro-channel plate 207. There is additional uncertainty regarding the number of photons that the electron releases from the phosphorescent screen 206. The noise is similar to shot noise and degrades the SNR of the device. The NF has the equivalent effect of lowering the native Quantum Efficiency (QE) of the device by the square of NF. Thus, the effective QE of an Image Intensifier device with a native QE of 45% and best NF of 1.7 will be reduced down to 15.571% ( )effective QE=native QE/NF$^2$.

Additional degradation is due to the fixed pattern noise (FPN) that is caused by the non-uniformity of the photoelectron gain of 207.

The gain non-uniformity is further aggravated due to the delay of the gating signal arrival between the edge and the center of the photocathode 208 due to its finite conductivity (referred to as "Irising").

Furthermore, the device 200 suffers from relatively low intra-frame dynamic range due to the high intensifier gain which will cause the CCD 204 to saturate earlier. If, for example, the Intensifier 200 has gain of 100, the effective dynamic range will be reduced by 100:1; thus if the CCD 204 has full well of 100,000 photons, it will effectively saturate at 1000 signal photons. Typical gains used are higher and can go up to 100,000 and hence squash down the dynamic range further.

In addition, the intra-frame dynamic range problem is further convolved by localized dynamic range problem. The localized dynamic range is significantly decreased due to the "halo" phenomenon of the Intensifier 200. The halo is the bright disk formed around high intensity points (or lines) due to electro-optical effect that occurs in the photocathode 208-to-MCP 207 and the gap 211 region in the intensifier tube 203. Some of the photoelectrons are not captured by the MCP 207; rather they are reflected azimuthally in various directions back toward the photocathode 208 and reflected back to the MCP 207 on which they land in a circular zone around their starting point. The halo unfortunately masks any neighboring lower signals thus reducing the local dynamic range.

In addition, there is further Modulation Transfer Function (MTF) degradation (can be observed as reduced sharpness, reduced contrast and reduced spatial resolution) due to the crosstalk between channels of the Micro-channel Plate (MCP) 207. The MTF is also degraded due to the Halo phenomenon, mentioned previously, that increases the Point Spread Function (PSF).

Figure 3A:
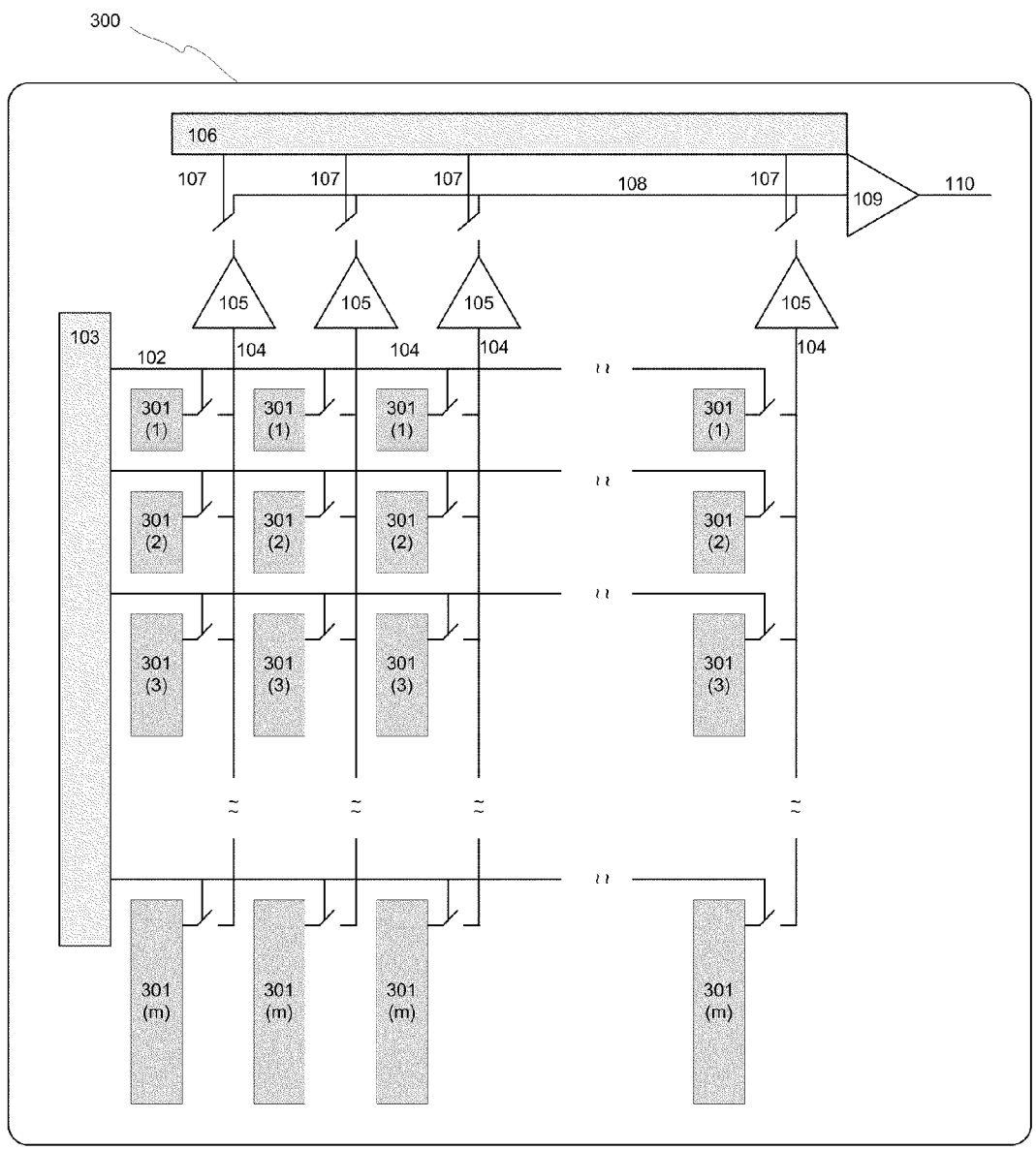
FIG. 3A is a diagram illustrating an exemplary implementation of CMOS imaging sensor array disclosed in this invention with varied geometry pixel based on spatial properties.
Figure 3B:
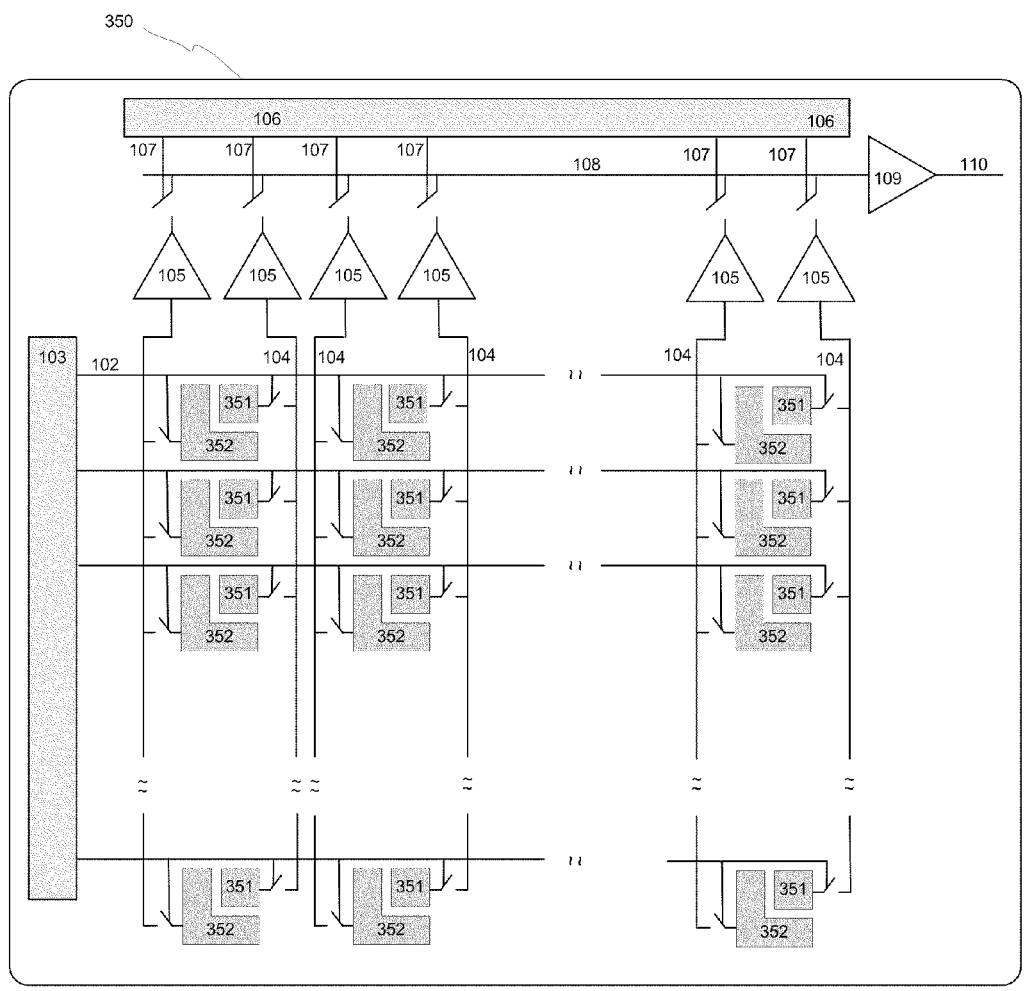
FIG. 3B is a diagram illustrating another exemplary implementation of CMOS imaging sensor array disclosed in this invention with varied geometry pixel based on spatial properties.

FIGS. 3A and 3B illustrate exemplary implementations of CMOS imaging sensor 300 and 350 arrays disclosed in this invention with varied geometry pixels 301(1) ... 301(m), 351 and 352 based on spatial properties.

Referring to FIG. 3A, the incoming photons are detected via a photo sensing element in each pixel 301. The photosensing element, not shown, can be any suitable element, such as a photodiode or a photogate. The diagram is applicable to both Active Pixel Sensor (APS) and a Passive Pixel Sensor. For an APS, there is at least additional reset control line going to all pixels (not shown here). The charge is either converted to voltage inside pixels 301 for an APS design or in the column bus amplifiers 105. The vertical shift register 103 controls the raw selection via buses (switches) 102, and the voltage (for APS) or charge (for passive pixel) is transferred to the column buffers 105 via a signal line or bus 104. Horizontal shift register 106 controls the selection for outputs of the column buffers 105 via buses (and switches) 107 and 108. The output of the column buffers 105 are then individually selected by the shift register 106 to the output amplifier 109 to produce the output 110 which will be further converted to digital data either on chip or off chip (not shown here).

In one implementation, CMOS sensor array 300 comprises pixels 301($i$) with geometry is of a rectangular shape with $X_{ij} \neq Y_{ij}$ where X is the pixel width, Y is the pixel height, i=0, 1, 2, ... m, m is the number of rows, j=0, 1, 2, ... n and n is the number of columns. Furthermore, $Y_{i1j} \neq Y_{i2j}$ where Y is the pixel height, i1, i2=0, 1, 2, ... m, m is number of rows j=0, 1, 2, ... n, n is the number of columns and i1≠i2. As seen from FIG. 3A, in one embodiment, the area of each rectangular pixel in a row increases for each succeeding row. For example, the area of pixel 300(1) is smaller than the area of pixel 300(2), which is smaller in area than pixel 300(3), etc.

CMOS sensor array 300 is ideally suitable for applications where the spatial frequency is dramatically different for the horizontal axis versus the vertical axis, such as the case for Echelle spectrograph that is widely used in various spectroscopy applications. Sensing two-dimensional spectrum produced by Echelle spectrograph, a configuration where $Y_i > X_i$ (e.g. $Y_i = 4 \cdot X_i$) where $Y_i$ dimension is aligned with the spectrograph "order separator" (also referred to as "cross disperser") where the resolution is lower. The configuration can furthermore have the characteristic of $Y_{i1} \geq Y_{i2}$ where i1>i2 and $\lambda_{i1} \leq \lambda_{i2}$ where λ is the starting wavelength of the order range thus providing for an IR order that is spaced closer than UV order.

Referring to FIG. 3B, in another implementation, CMOS sensor array 350 comprises a plurality of pixels 351, each with geometry of a rectangular shape and a plurality of pixels 352, each with geometry of a complex geometry shape (such as an L shape shown here). In this exemplary implementation, pixels 351 occupy odd (or even) columns and has smaller area than pixels 352 that occupy even (or odd) columns. In one embodiment, the geometry of pixels 351 is a square.

CMOS sensor array 350 is ideally suitable for application where the signal level varies dramatically with respect to the spatial location such as the case for mass spectroscopy where major element strong spectral lines may appear in the vicinity of trace element weak spectral lines.

More pixel geometries (e.g. octagon) are possible and not limited to the exemplary implementations shown here.

Additional combination of pixel geometries with respect to spatial location (e.g., sub-matrix of the sensor array with one type of geometry and another sub matrix with another) are possible and are not limited to what is shown here.

Figure 4A:
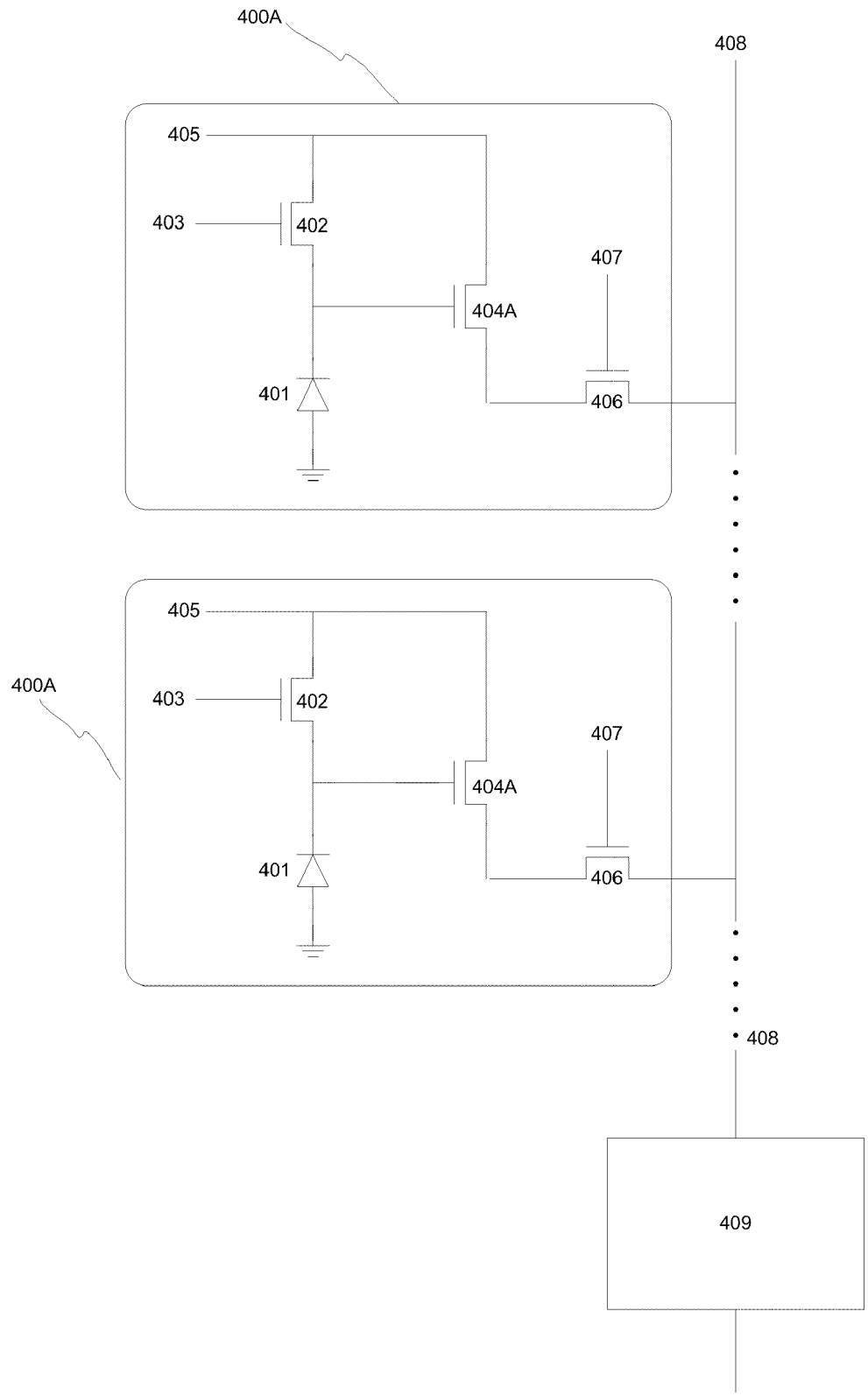
FIG. 4A is a block diagram depicting one type of conventional 3T CMOS Active Pixel sensor array.
Figure 4B:
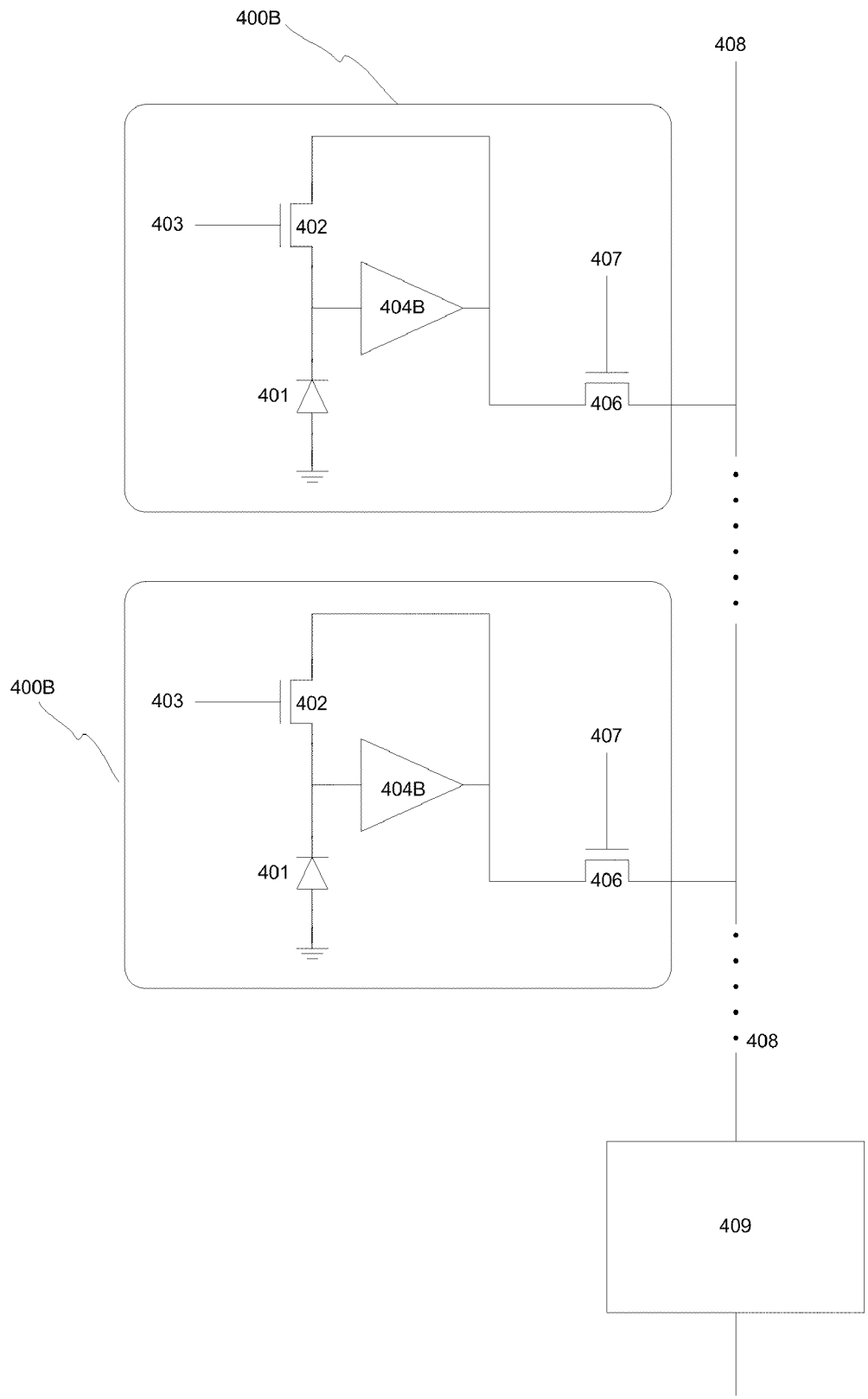
FIG. 4B is a block diagram depicting another type of conventional 3T CMOS Active Pixel sensor array.

FIGS. 4A and 4B depict Active Pixel Sensors 400A and 400B of three transistors (3T). The active pixel sensor cell 400A and 400B is typically (but not always) realized with N-type transistors. A CMOS imager comprises an array of pixels, two of which are shown here. Both pixels shown in each figure are identical. Pixel 400A and 400B includes a reversed-biased photodiode 401 or other radiation sensor overlying a doped region of a substrate for accumulating photo-generated charge during an integration period. Photodiode 401 is reset high to a voltage 405, which is typically VDD that depends on the process. The reset is controlled via a signal line 403 and a transistor 402 (acting as a reset switch). An amplifier 404A and 404B, typically a source-follower, converts the charge from the collection region and provides corresponding voltage level on a column bus 408 when a select transistor 406 is on. The signal is then read out by a column buffer 409. Select transistor 406 is controlled by a row select clock 407.

Figure 5A:
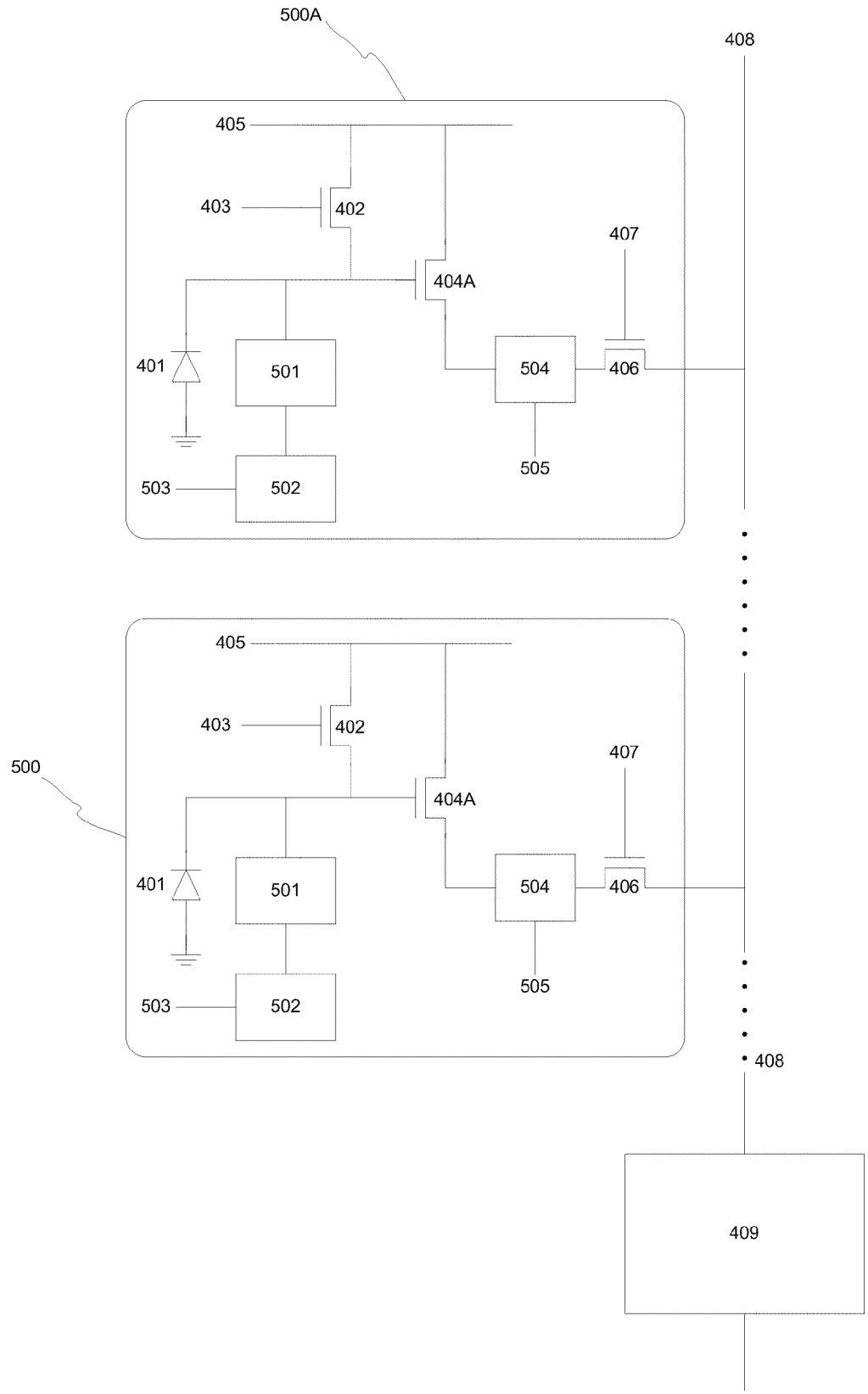
FIG. 5A is a block diagram depicting the CMOS Active Pixel according to one embodiment that can be used in the array of FIGS. 3A and 3B.

FIG. 5A is block diagrams depicting a CMOS Active Pixel 500A that can be used in the arrays of FIGS. 3A and 3B according to one embodiment. The active pixel sensor cell 500A is typically (but not always) realized with N-type transistors. For example, a P-type transistor may be used. A CMOS imager comprises an array of pixels, two of which are shown here. Both pixels 500A shown here are identical. Pixel 500A includes a reversed-biased photodiode 401 (photogate, bipolar junction transistor (BJT), or other radiation sensor) overlying a doped region of a substrate for accumulating photo-generated charge during an integration period. Photodiode 401 is reset high to a reference voltage 405, (typically VDD-threshold that depends on the process). The reset is controlled via signal line 403 and transistor 402. The full-well is externally adjusted via a plurality of conversion gain units 501. An example of a suitable conversion gain units is shown below in FIG. 6A. A plurality of conversion gain units 501 integrate the charge detected by the photodiode 401 with externally adjusted conversion gain while maintaining pixel linearity. The amount of conversion gain is externally adjustable and is controlled via a plurality of conversion gain control units 502. An example of a suitable conversion gain control units is shown below in FIG. 6A. The conversion gain control units 502 are set via a plurality of control signal lines 503 (only a single line is drawn here for simplicity). An amplifier 404A, (typically a source-follower), converts the integrated charge and provides corresponding voltage level that is stored in a plurality of memory units 504. An example of a suitable memory unit is shown below in FIG. 6B. The memory units 504 are controlled via a plurality of control lines 505 (only a single line is drawn here for simplicity). Each stored signal appears on column bus 408 when select transistor 406 is on, and one of the memory units 504 is selected via control lines 505. The signal is then read out by column buffer 409. Select transistor 406 is controlled by a row select clock 407.

Thus for a single column bus and buffer, sequential reads with multiple select pulses are provided. Alternative implementations not shown here provide for parallel reads of all stored signals via multiple column bus and buffers.

Figure 5B:
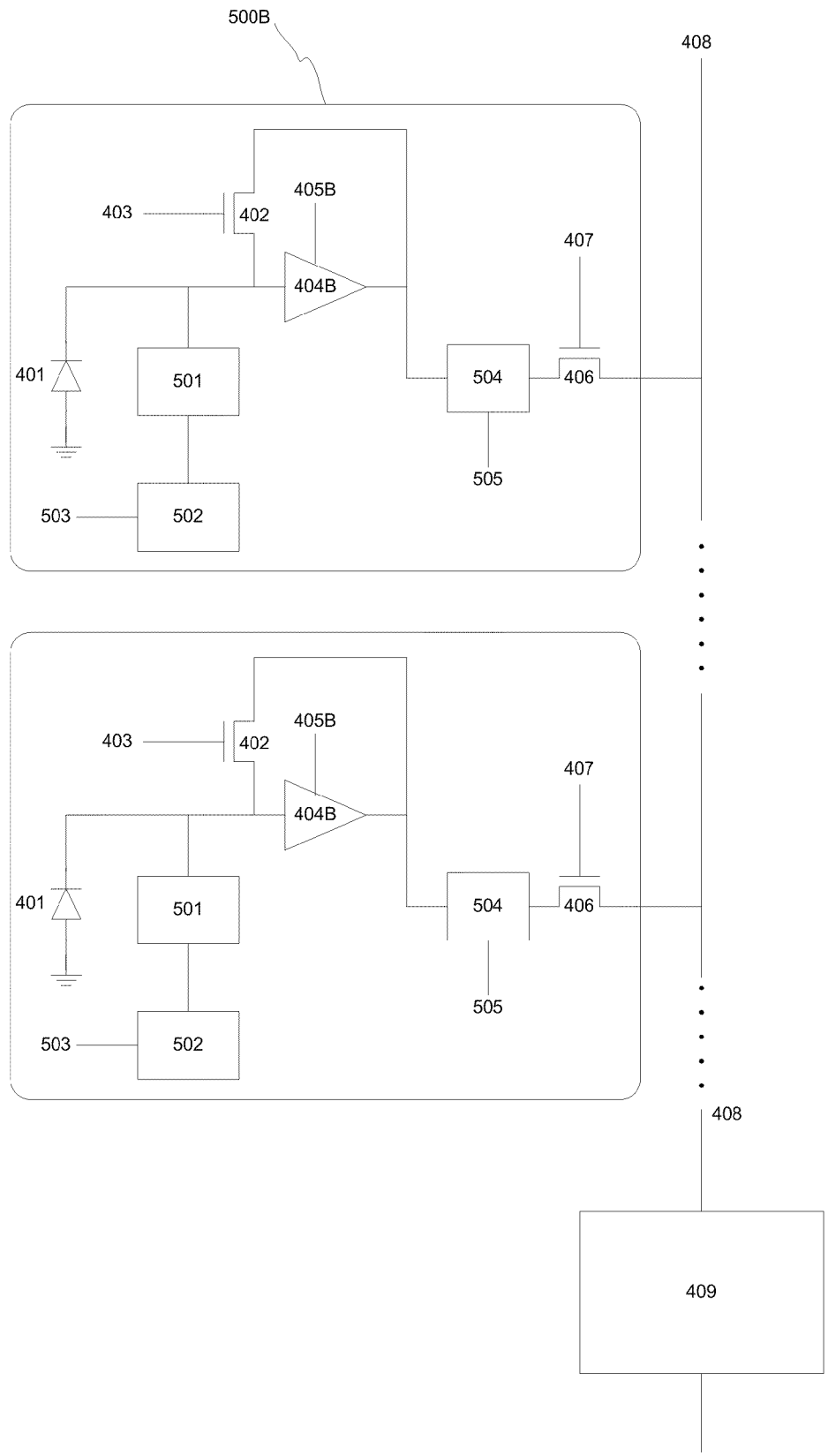
FIG. 5B is a block diagram depicting the CMOS Active Pixel according to another embodiment that can be used in the array of FIGS. 3A and 3B.

FIG. 5B is a block diagram depicting the CMOS Active Pixel 500B that can be used in the arrays of FIGS. 3A and 3B according to another embodiment. The active pixel sensor cell 500B is typically (but not always) realized with N-type transistors. For example, a P-type transistor may be used. A CMOS imager comprises an array of pixels, two of which are shown here. Both pixels 500B shown here are identical. Pixel 500B includes reversed-biased photodiode 401 overlying a doped region of a substrate for accumulating photo-generated charge during an integration period. Photodiode 401 is reset to operation amplifier 404A reference voltage 405A. The reset is controlled via line 403 and transistor 402. The full-well is externally adjusted via a plurality of conversion gain units 501. The plurality of conversion gain units 501 integrate the charge detected by the photodiode 401 with externally adjusted conversion gain while maintaining pixel linearity. The amount of conversion gain is externally adjustable and is controlled via a plurality of conversion gain control units 502. The conversion gain control units 502 are set via a plurality of control lines 503 (only a single line is drawn here for simplicity). An operation amplifier 404B, (typically an inverting amplifier), converts the integrated charge and provides corresponding voltage level that is stored in a plurality of memory units 504. The memory units 504 are controlled via a plurality of control signal lines 505 (only a single line is drawn here for simplicity). Each stored signal appears on column bus 408 when select transistor 406 is on and one of the memory units in 504 is selected via control signals 505. The signal is then read out by a column buffer 409. Select transistor 406 is controlled by a row select clock 407.

Thus for a single column bus and buffer, sequential reads with multiple select pulses are provided. Alternative implementation not shown here provides for parallel reads of all stored signals via multiple column bus and buffers.

Pixels 500A or 500B as disclosed thus provide for individual full-well per pixel, thus allowing the simultaneous detection of very strong and very weak signals. The full-well can be externally and linearly adjusted individually for each pixel via the individual conversion gains. Let $CG_{i1,j1}$ and $CG_{i2,j2}$ be conversion gain values for pixels at locations (i1,j1) and (i2,j2) where i1,i2=0, 1, 2, ... m, m is number of rows, j1, j2=0, 1, 2, ... n, n is number of columns, i1≠i2 or j1≠j2 then $CG_{i1,j1} \neq CG_{i2,j2}$. Each of the conversion gain values can be adjusted in real-time before each sampling operation if required.

The conversion gain values may for example derived from prior frames acquired.

The conversion gain values may be preset based on spatial location and/or pixel cell geometry.

Various sub cases are possible for example but not limited to full-well$_{odd}$<full-well$_{even}$ via $CG_{odd}$>$CG_{even}$ where even columns and odd columns have different conversion gain values can be used so that the pixel with the best match of full-well to signal level will be chosen by the signal processing chain, thus allowing for simultaneous detection of very high intensity and very low intensity vertical lines.

For example in spectroscopy applications the simultaneous detection of strong signal lines resulted from major elements and weak signal lines resulted from trace elements is required. The present invention solves this problem via the propriety programmable amplification per pixel (or any sub section of pixels such as column).

Pixels 500A or 500B as disclosed further support the detection of multiple events without saturation, or several high frequency consecutive events. Pixels 500A or 500B are being exposed multiple times without being read in between exposure periods and with or without a reset. The downstream signal chain can then read all the stored values within each pixel simultaneously and evaluate them independently or in any desired combination.

Eliminating the read operation after sampling allows for a very high frequency sampling. The read frequency is limited by the frame rate while the sampling rate is orders of magnitude faster than the frame rate, e.g., array supporting of 1000 f/sec has read frequency ≦1 kHz. Memory units 504 sampling frequency is >10 MHz, thus allowing for a sampling of very fast occurring events.

The exposure periods and the sampling frequency are adjustable (and controlled by the external system not shown here).

If a reset is employed in between consecutive fast sampling operations, the resulted multiple exposure periods are independent of each other.

In this case pixels 500A or 500B are repeatedly reset via conversion gain control units 502. In between the consecutive resets, the radiation sensor 401 integrates incoming radiation (such as photons). Each integrated signal full-well is controlled via the conversion gain units 501. The integrated signal may be amplified and is stored in one of the memory units 504. In other words, sequentially, for each individual memory unit inside memory units 504, the pixel is reset, and then integrates to a chosen full-well, the integrated signal maybe amplified and sampled; the sample is stored in one individual memory unit. The conversion gain values of conversion gain units 501 are set via the conversion gain control units 502 either at the beginning of the process or before each sampling. Prior to the whole process, the memory units 504 may be cleared via memory controls lines 505. The time gap between the repeated cycles can be varied and is controlled via the memory control lines 505.

For example, in Laser Induced Breakdown Spectroscopy (LIBS) or in SPARK spectroscopy after the emission of continuum radiation period and during the characteristic radiation period, some elements may show emission prior to others with a small time gap in between and with the possibility of strong signals that would saturate if a single exposure period would have been used.

The present invention solves this problem via the proprietary high frequency multiple exposure periods.

If no reset is performed in between consecutive fast sampling operations, an even faster rate can be achieved allowing detecting minute changes in the waveform of the input signal.

In this case pixels 500A or 500B are first reset via the transistors 402. The radiation sensor 401 then integrates incoming radiation (such as photons). Each integrated signal full-well is controlled via the conversion gain units 501. The integrated signal may be amplified and is repeatedly sampled. The sampled signals are each stored in one of the memory units 504. In other words, sequentially, for each individual memory unit inside memory units 504, the integrated signal may be amplified; it is sampled and the sample is stored in one individual memory unit. No reset of pixel is performed in between sampling operations. The conversion gain values of conversion gain units 501 are set via conversion gain control units 502 at the beginning of the process before the single pixel reset. Prior to the whole process, the memory units 504 may be cleared via memory controls lines 505. The time gap between the repeated cycles can be varied and is controlled via the memory control lines 505.

For example, in Laser Induced Breakdown Spectroscopy (LIBS) or in SPARK spectroscopy after the emission of continuum radiation period and during the characteristic radiation period, different elements may produce emission lines of a very high frequency that cannot be detected via multiple reads as done in conventional arrays.

The present invention solves this problem via the proprietary multiple high frequency sampling operation within a single short exposure period.

Figure 6A:
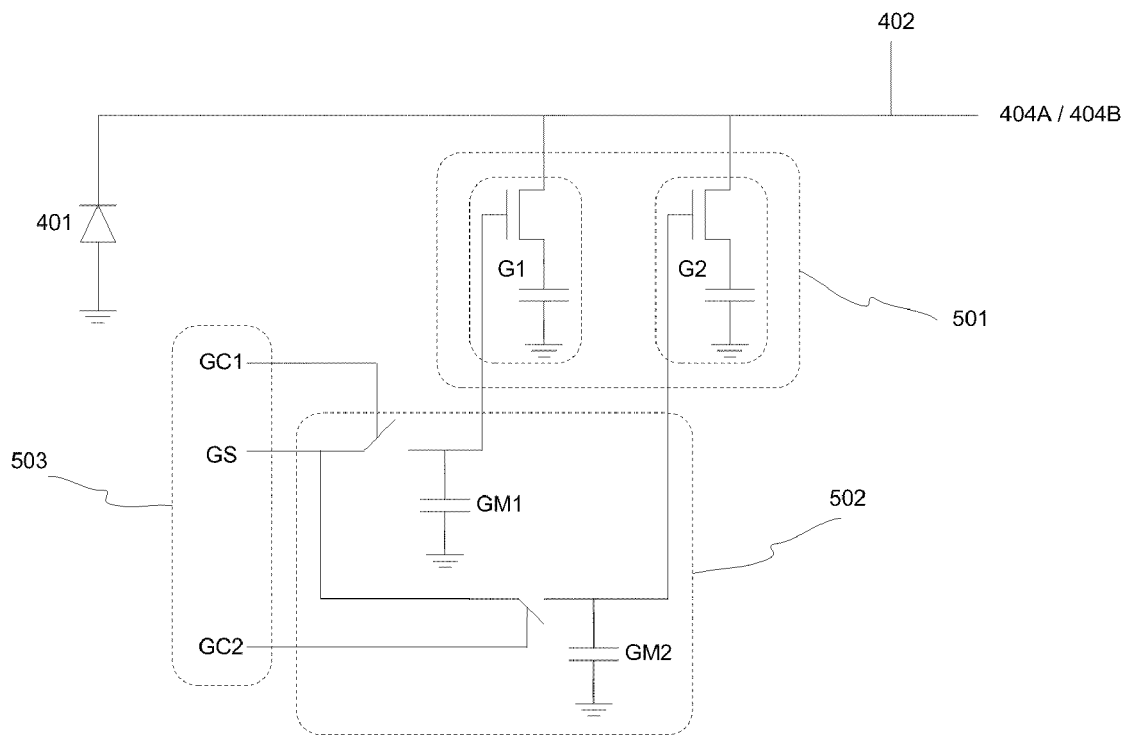
FIG. 6A is a diagram showing one implementation of a conversion gain units and conversion gain control units in FIGS. 5A and 5B.

FIG. 6A provides an example for one implementation of the conversion gain units and conversion gain control units of FIGS. 5A and 5B. Other implementations are also possible, such as known to those skilled in the art. For simplicity, two conversion gain units are shown are shown.

FIG. 6A depicts conversion gain units 501 having two integrating capacitors and their associated control resistors Gi. The selected combination of the conversion gain units is stored in a dynamic memory (DRAM) depicted in conversion gain control units 502, where each conversion gain has a memory capacitor GMi and controlling switch GCi. The controlling switches GCi and the conversion gain state (such as on/off) switch GS are included in control lines 503.

Figure 6B:
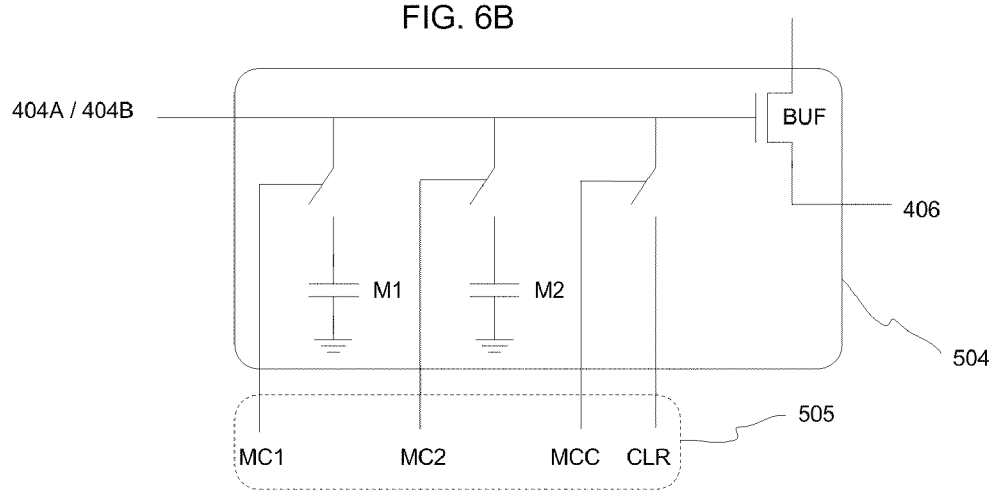
FIG. 6B is a diagram showing one implementation of a memory unit in FIGS. 5A and 5B.

FIG. 6B provides an example for one implementation of the memory units 504 of FIGS. 5A and 5B. Other implementations are also possible, such as known to those skilled in the art. For simplicity, two memory units are shown.

FIG. 6B depicts memory units 504 with their control lines 505. The memory units 504 implemented as dynamic memory with memory capacitors Mi, associated switches MCi, clear switch CLR for all memory, and a buffer for driving the output from the selected memory. The memory units 504 are sequentially selected by MCi via the control lines MCi shown in 505. The controls lines 505 also include a clear switch MCC.

Having thus described embodiments of the present invention, persons of ordinary skill in the art will recognize that changes may be made in form and detail without departing from the scope of the invention.

What is claimed is:

1. A pixel cell array for an imager, comprising:
   a plurality of first pixel cells of a first geometrical shape; and
   a plurality of second pixel cells of a second geometrical shape, wherein each of the pixel cells comprises:
   a radiation sensor;
   an amplifier coupled to an output of the radiation sensor;
   a reset switch coupled to the output of the radiation sensor and an input of the amplifier;
   a plurality of conversion gain units coupled to the output of the radiation sensor and the input of the amplifier;
   a plurality of control units coupled to the plurality of conversion gain units;
   a plurality of memory units coupled to an output of the amplifier;
   a row select switch coupled to outputs of the memory units; and
   a column output line coupled to the row select switch.

2. The pixel cell array of claim 1, wherein first geometrical shape has a different shape than the second geometrical shape.

3. The pixel cell array of claim 1, wherein first geometrical shape has a different area than the second geometrical shape.

4. The pixel cell array of claim 1, wherein the amplifier comprises a source follower transistor.

5. The pixel cell array of claim 1, wherein the amplifier comprises an operational amplifier.

6. The pixel cell array of claim 1, wherein the switches comprise transistors.

7. The pixel cell array of claim 1, wherein the radiation sensor comprises a photodiode.

8. The pixel cell array of claim 1, wherein the radiation sensor comprises a photogate.

9. The pixel cell array of claim 1, wherein the radiation sensor comprises a bipolar junction transistor (BJT).

10. The pixel cell array of claim 1, wherein the first pixel cells and the second pixel cells are in alternating columns of the array.

11. The pixel cell array of claim 10, wherein the second pixel cells are an L-shape and have a larger area than the first pixel cells.

12. The pixel cell array of claim 11, wherein the first pixel cells have a rectangular or square shape.

13. The pixel cell array of claim 1, wherein the first pixel cells are along a first row, and the second pixel cells are along a second row, wherein the first pixel cells have an area less than the second pixel cells.

14. The pixel cell array of claim 13, further comprising a plurality of pixel cells in succeeding rows, each row of pixel cells having an area less than a subsequent row of pixel cells.

15. A method of operating a pixel cell array sensor, the pixel cell array having a plurality of pixel cells with plurality of shapes, the pixel cells having a radiation sensor coupled to an amplifier and to a reset switch, a plurality of conversion gain units coupled to a plurality of control units, a plurality of memory units coupled to the amplifier, a row select switch coupled between the memory units and an output line, the method comprising:
 (a) clearing the memory units;
 (b) for each memory unit,
  setting a reset voltage on the row reset switch;
  increasing the voltage on an input node of the conversion gain units in proportion to a photon-generated charge by the radiation sensor; and
  sampling outputs of the conversion gain units into the memory unit;
 (c) activating the row select switch;
 (d) for each memory unit,
  selecting a memory unit; and then
  increasing a voltage on an output of a column in proportion to the voltage stored in the column of the memory unit.

16. The method of claim 15, further comprising selecting conversion gains for the conversion gain units prior to (b).

17. The method of claim 15, further comprising selecting conversion gains for the conversion gain units for each memory unit prior to setting the reset voltage for each memory unit.

18. The method of claim 15, wherein at least two of the pixel cells have different full wells based on a selection of conversion gain for a corresponding pixel cell.

19. The method of claim 15, wherein the pixel cells comprise a plurality of first pixel cells and a plurality of second pixel cells in alternating columns of the array.

20. The method of claim 19, wherein the second pixel cells are an L-shape and have a larger area than the first pixel cells.

21. The method of claim 20, wherein the first pixel cells have a rectangular or square shape.

22. The method of claim 21, wherein each row of pixel cells has an area less than a subsequent row of pixel cells.

23. A method of operating a pixel cell array sensor, the pixel cell array having a plurality of pixel cells with a plurality of shapes, the pixel cells having a radiation sensor coupled to an amplifier and to a reset switch, a plurality of conversion gain units coupled to a plurality of control units, a plurality of memory units coupled to the amplifier, a row select switch coupled between the memory units and an output line, the method comprising:
 selecting conversion gains for the conversion gain units;
 setting a reset voltage on the reset switch;
 clearing the memory units;
 increasing a voltage on an input node of the conversion gain units in proportion to a photon-generated charge by the radiation sensor;
 for each memory unit, sampling outputs of the conversion gain units into a memory unit;
 activating the row select switch; and
 for each memory unit, selecting a memory unit and increasing a voltage on an output of a column in proportion to the voltage stored in the column of the memory unit.

24. The method of claim 23, wherein the pixel cells comprise a plurality of first pixel cells and a plurality of second pixel cells, wherein first pixel cells have a geometrical shape different than the second pixel cells.

25. The method of claim 23, wherein the pixel cells comprise a plurality of first pixel cells and a plurality of second pixel cells, wherein first pixel cells have areas different than the second pixel cells.

26. The method of claim 23, wherein each row of pixel cells has an area less than a subsequent row of pixel cells.

* * * * *